(12) United States Patent
Chou

(10) Patent No.: US 7,432,528 B2
(45) Date of Patent: Oct. 7, 2008

(54) TFD LCD PANEL

(75) Inventor: Weng-Bing Chou, Tao Yuan Shien (TW)

(73) Assignee: AU Optronics Corporation, Hsin-Chu (TW)

( * ) Notice: Subject to any disclaimer, the term of this patent is extended or adjusted under 35 U.S.C. 154(b) by 90 days.

(21) Appl. No.: 11/462,523

(22) Filed: Aug. 4, 2006

(65) Prior Publication Data

US 2007/0040957 A1    Feb. 22, 2007

(30) Foreign Application Priority Data

Aug. 17, 2005    (TW) ............................... 94128058 A (51) Int. Cl.
*G02F 1/136* (2006.01)

(52) U.S. Cl. ............................ 257/59; 257/72; 257/602; 257/E27.132; 257/E29.343; 257/E27.131; 349/49; 349/51; 349/52

(58) Field of Classification Search .................. 257/59, 257/72, E27.131, E27.132, E29.343; 349/49, 349/51, 52
See application file for complete search history.

(56) References Cited

U.S. PATENT DOCUMENTS

| | | | |
|---|---|---|---|
| 5,879,960 A | 3/1999 | Miyoshi | 438/30 |
| 5,926,236 A | 7/1999 | den Boer et al. | 349/51 |
| 6,040,201 A | 3/2000 | Akiba et al. | 438/30 |
| 6,271,050 B1 | 8/2001 | Akiba et al. | 438/30 |
| 6,734,460 B2 | 5/2004 | Okumura et al. | 257/72 |
| 2007/0040956 A1* | 2/2007 | Shin et al. | 349/50 |

* cited by examiner

*Primary Examiner*—Minh-Loan Tran
*Assistant Examiner*—Selim Ahmed
(74) *Attorney, Agent, or Firm*—Kusner & Jaffe (57) ABSTRACT

Active devices in a thin film diode (TFD) liquid crystal display (LCD) panel used to control liquid crystal are formed by a metal layer, a transparent conductive layer, and an insulating layer sequentially on a substrate, wherein the metal layer is used as transmitting signal and the transparent conductive layer is used as bottom metal layer of metal-insulator-metal (MIM) thin film diode. The metal layer, the transparent conductive layer, and the insulating layer are defined with desired patterns. Further, a dielectric layer is formed over the substrate, metal layer, the transparent conductive layer, and the insulating layer, and defined to form the locations of electrode terminal and MIM thin film diode by using lithographic process. Next, another transparent conductive layer is formed on the dielectric layer and defined to form a pixel electrode and top metal layer of the MIM thin film diode by using lithographic process.

14 Claims, 6 Drawing Sheets

TFD LCD PANEL

FIELD OF THE INVENTION

The present invention relates to a thin film diode (TFD) liquid crystal display (LCD) panel, and more specifically to an active devices in a thin film diode liquid crystal display panel and method for manufacturing the same.

BACKGROUND OF THE INVENTION

The liquid crystal display (LCD) device primarily includes liquid crystal material sandwiched in between two opposite substrates. The proper bias is generally introduced to alter the angle of the liquid crystal molecules, thereby changing the optical character of the incident light. The liquid crystal display may display the predetermined pattern through the control of pixels. The applications of the liquid crystal display are quite widespread within our daily life and these devices occupy everyplace where the information is needed to be displayed. For example, the liquid crystal display is adopted to the desk top personal computers, the notebooks, the PDA display, the displays of the handy mobile communication products, the displays of the digital timepieces, the displays of the office electric products or the family electric products, and even adopted to the indoor and outdoor dynamical commercial advertising boards.

The types for driving the liquid crystal display include passive and active driving types. At present, the liquid crystal displays primarily adopt to the active driving type to drive the liquid crystal due to the consideration of high reaction speed. The active driving type liquid crystal display generally employs the thin film transistor (TFT) to control the direction of the molecules of the liquid crystal. However, the manufacturing for the thin film transistor is complicated, it generally needs four to five photolithography processes. The extremely complex half-tone lithography processes or other half-exposure-development is introduced in order to reduce the number of mask for the photolithography processes. However, it comes along with the low yield issue.

An active driving type LCD employs the thin film diode as a driving element. The thin film diode has many advantages such as simple structure, simple process and high yield. The prior arts are incorporated herein for reference, U.S. Pat. Nos. 5,926,236, 5,879,960, 6,040,201, 6,271,050, 6,734,460, and JP Patent Publication No. 08-220563 (1996) and 08-320495 (1996).

Figure 1A:
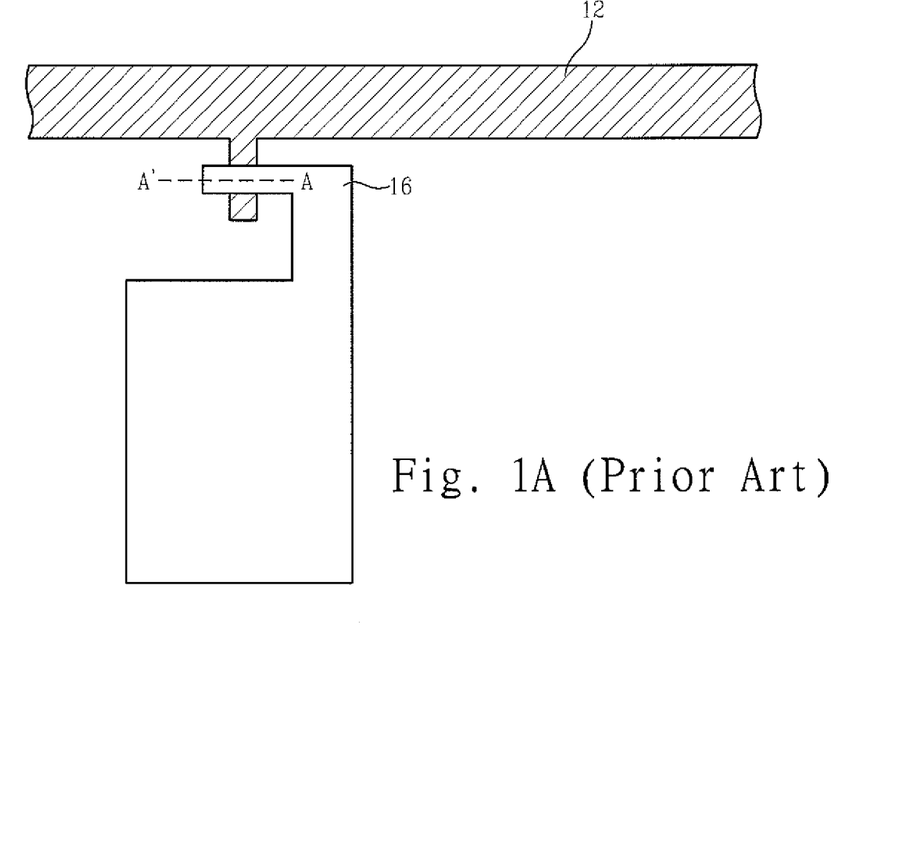
FIG. 1A and FIG. 1B illustrate the top views of thin film diode, the scanning line and pixel electrode according to the prior art.
Figure 1B:
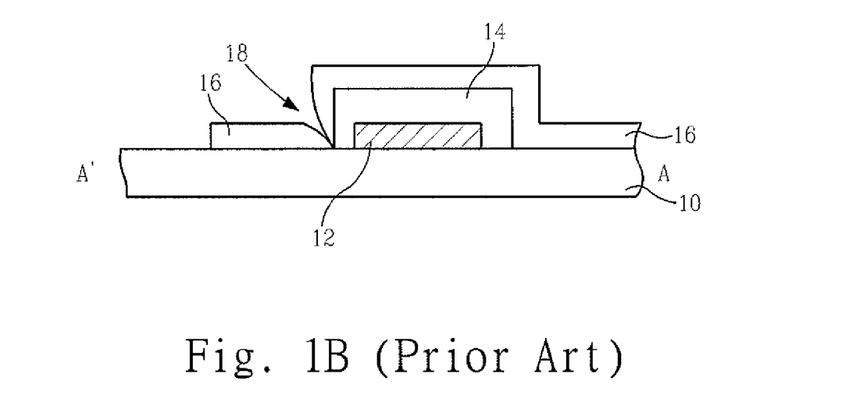

FIG. 1A illustrates a part of a top view according to prior art, which uses the thin film diode as a driving element in a pixel of a liquid crystal display. The prior art includes a scanning line 12 and a transparent conductive layer 16 used as a pixel electrode. The overlapping area of the transparent conductive layer 16 and the scanning line 12 is a metal-insulator-metal (MIM) structure. FIG. 1B illustrates a cross-section view taken along the line AA' in FIG. 1A. The scanning line 12 as the bottom metal layer of the metal-insulator-metal structure is formed on a substrate 10, and an insulating layer 14 is overlapped on the scanning line 12. A defect as indicated by the label 18 in FIG. 1B will be generated during the formation of the transparent conductive layer 16 due to the slope structure of layers 12 and 14 used as the bottom metal layer of metal-insulator-metal structure. The breakdown occurs at the defect 18, thereby causing the "bad point" of the pixel.

A solution is disclosed by the U.S. Pat. No. 5,926,236 to avoid the slope structure and increase the aperture ratio. However, the signal processes of the terminal part are not mentioned. Besides, the current-voltage curve is not symmetric due to the metal materials of the top and the bottom layers are different.

Figure 2:
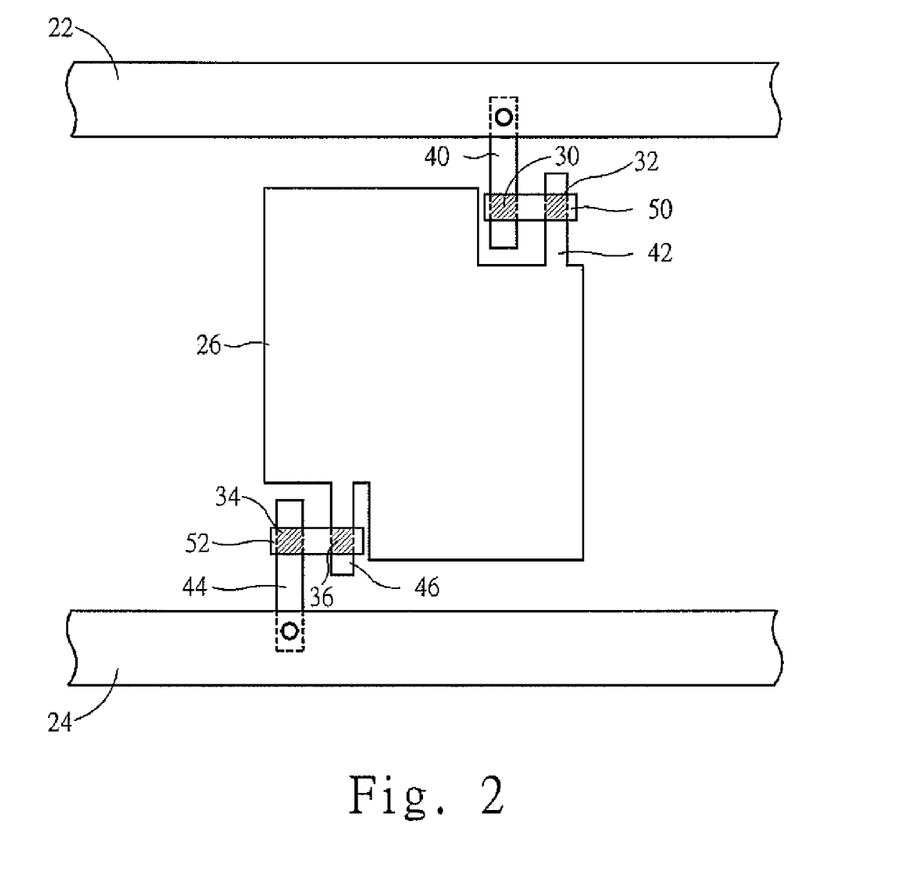
FIG. 2 illustrates the top view of the conventional back-to-back thin film diode, scanning line, pixel electrode.

To solve the current-voltage curve that is not symmetric caused by the different metal materials consisting of the top and bottom layers, a method is disclosed to introduce the back-to-back thin film diode to obtain the symmetric current-voltage curve, that is to say, uses two metal-insulator-metal structures. As FIG. 2 shows, a pixel electrode 26 is configured between the first scanning line 22 and the second scanning line 24, and is electrically coupled to the first scanning line 22 by the two similar metal-insulator-metal thin film diodes 30, 32, and the pixel electrode 26 electrically coupled to the second scanning line 24 by two other metal-insulator-metal thin film diodes 34, 36. The metal-insulator-metal thin film diode 30 is formed by a top electrode 40 and a bottom electrode 50. The metal-insulator-metal thin film diode 32 is formed by a top electrode 50 and a bottom electro 42. The metal-insulator-metal thin film diode 34 is formed by a top electrode 44 and a bottom electrode 52. The metal-insulator-metal thin film diode 36 is formed by a top electrode 46 and a bottom electrode 52.

However, this method will increase the complexity of the structure and the steps of the manufacturing process, especially to increase the photolithography process. Furthermore, the additional MIM structure will decrease the area for the pixel electrode to lower the aperture ratio.

Another solution expressed in the JP Patent Application Laid-Open Publication No. 08-320495 uses the anode oxidation method to form the top and the bottom layers with the same materials. However, the manufacturing is more complex and the material is limited to the tantalum (Ta) metal that is available for anode oxidation.

In view of above-mentioned insufficient and deficiencies, what is desired is to provide a novel structure for the thin film diode liquid crystal display to solve these problems.

SUMMARY OF THE INVENTION

In view of above-mentioned problems and disadvantages caused by the conventional thin film diode structure, the object of the present invention is to provide a metal-insulator-metal (MIM) structure without the slope structure.

Another object of the present invention is to utilize the top and the bottom metal layers with the same materials, so that the single metal-insulator-metal (MIM) structure has symmetric current-voltage curve.

Still another object of present invention is to manufacture a metal-insulator-metal (MIM) thin film diode structure without adding the number of masks for the photolithography processes to improve the yields and the product reliability.

Yet another object of present invention is that the area of the metal-insulator-metal (MIM) thin film diode will not affected by the alignment and the exposure precision, and the areas of the metal-insulator-metal thin film diode are almost the same.

In view of above-mentioned, the object of the present invention is to disclose a thin film diode liquid crystal display panel comprising a first substrate, a second substrate and molecules of liquid crystal injected between the first substrate and the second substrate. The foregoing first substrate includes a first scanning line and a second scanning line formed on the first substrate. A first transparent conductive layer is formed on the first scanning line and the second scanning line, an insulating layer is formed on the first transparent conductive layer, a dielectric layer and a second transparent conductive layer are formed over the first substrate and the insulating layer. The first scanning line and the second scanning line are separated with each other, and the first scanning line and the second scanning line are conductive layers. The dielectric layer is formed over the first substrate and the insulating layer, and the dielectric layer has a first opening over the first scanning line to expose the insulating layer and a second opening over the second scanning line to expose the insulating layer. Further, the dielectric layer has a third opening at a pixel area. The foregoing second transparent conductive layer is formed in the first opening, the second opening, and inside the third opening, wherein the second transparent conductive layer formed in the first opening, the first transparent conductive layer, and the insulating layer form a first thin film diode, and the second transparent conductive layer formed in the second opening, first transparent conductive layer and the insulating layer form a second thin film diode. The second transparent conductive layer forms a first pixel electrode at the pixel area, and the first pixel is electrically connected to the first thin film diode and the second thin film diode through the second transparent conductive layer. The foregoing second substrate includes a second pixel electrode over the second substrate and a data line. The data line is electrically connected to the second pixel electrode, and the first scanning line and the second scanning line are vertical. When the first substrate is assembled to the second substrate, the first pixel electrode is overlapped with the second pixel electrode.

Also, the present invention provides an active device for controlling the liquid crystal display comprising a first scanning line and a second scanning line separated with each other are conductive layers. The first transparent conductive layer and an insulating layer are formed sequentially over the first scanning line and the second scanning line, a dielectric layer and a second transparent conductive layer are formed over the insulating layer. The foregoing dielectric layer has a first opening formed over the first scanning line to expose the insulating layer and a second opening formed over the second scanning line to expose the insulating layer. The second transparent conductive layer is formed within the first opening and the second opening, wherein the second transparent conductive layer formed within the first opening, the first transparent conductive layer and the insulating layer form a first thin film diode, and the second transparent conductive layer formed within the second opening, the first transparent conductive layer and the insulating layer form a second thin film diode. The first thin film diode and the second thin film diode are separately electrically connected to a pixel electrode.

Still, the present invention provides a method of manufacturing active device for controlling the liquid crystal display, wherein the method comprises a step of depositing a conductive layer, a first transparent conductive layer and an insulating layer on a substrate. Afterward, the conductive layer, the first transparent conductive layer and the insulating layer are defined as a first scanning line and a second scanning line, wherein the first scanning line and the second scanning line are separated with each other. Next, a dielectric layer is deposited over the substrate and the insulating layer. Then, the dielectric layer is defined to have a first opening and a second opening, wherein the first opening is formed over the first scanning line to expose the insulating layer and the second opening is formed over the second scanning line to expose the insulating layer. On the other hand, a second transparent conductive layer is deposited over the substrate, the dielectric layer, and within the first opening and the second opening. Further, the second transparent conductive layer is defined as a first top layer within the first opening, and a second top layer within the second opening, wherein the first top layer, the insulating layer and the first transparent conductive layer form a first thin film diode, and the second top layer, the insulating layer and the first transparent conductive layer form a second thin film diode. The first thin film and the second thin film diode are separately and electrically connected to a pixel electrode.

DETAILED DESCRIPTION OF THE PREFERRED EMBODIMENT

Some embodiments according to the present invention are described in detail as following. However, referring now to the drawings and the following description wherein the showings and description are for the purpose of illustrating the preferred embodiments of the present invention only, and not for the purpose of limiting the same.

Moreover, the devices of the different elements are not shown to scale. Some dimensions of the related devices are exaggerated and meaningless portions are not drawn to provide a more clear description and comprehension of the present invention.

The present invention relates to a liquid crystal display panel that employs a metal-insulator-metal structure as the thin film diode (TFD) without slope structure, wherein the thin film diode is used as an active device for controlling the liquid crystal. The thin film diode liquid crystal display panel includes a first substrate, a second substrate and the liquid crystal arranged between the first substrate and the second substrate.

The thin film diode is formed on the first substrate, wherein the first substrate includes a first scanning line, a second scanning line, a first transparent conductive layer formed over the first scanning line and the second scanning line, an insulating layer formed over the first transparent conductive layer, and a dielectric layer formed over the first substrate and the insulating layer. The TFD also includes a second transparent conductive layer.

The first scanning line keeps a space from the second scanning line with each other. The first scanning line and the second scanning line are formed of metal or conductive material. The dielectric layer is formed over the first substrate and the insulating layer. The dielectric layer has a first opening over the first scanning line to expose the insulating layer. The dielectric layer has a second opening over the second scanning line to expose the insulating layer as well. Besides, the dielectric layer has an opening at a pixel area. The dielectric layer further has a first contact window and a second contact window, wherein the first contact window is formed over the first scanning line and the second contact window is formed over the second scanning line.

The second transparent conductive layer is formed within the first opening, the second opening and the opening at the pixel area, wherein the second transparent conductive layer in the first opening, the insulating layer and the first transparent conductive layer form a first thin film diode. The second transparent conductive layer within the second opening, the insulating layer and the first transparent conductive layer act as a second thin film diode. The second transparent conductive layer at the pixel area performs as a first pixel electrode. The first pixel electrode is electrically connected to the first thin film diode and the second thin film diode through the second transparent conductive layer.

The second transparent conductive layer is also formed in the first contact window as the terminal of the first scanning line, and formed in the second contact window as the terminal of the second scanning line. The materials of the first transparent conductive and the second transparent conductive could be indium-tin-oxide (ITO) or indium-zinc-oxide (IZO). The insulating layer is formed of silicon oxide, silicon oxynitride (SiON), tantalum oxide (TaO) or the alloy having Silicon nitride (SiN). The material of the conductive layer includes aluminum (Al), chromium (Cr), molybdenum (Mo) or titanium/aluminum/titanium tri-layer.

Moreover, the second substrate includes a second pixel electrode formed on the second substrate and the second substrate includes a data line. The data line is electrically connected to the second pixel electrode, and the data line is substantially perpendicular to the first scanning line and the second scanning line. When the first substrate is assembled to the second substrate, the first pixel electrode is overlapped with the second pixel electrode. The first pixel electrode is located between the first scanning line and the second scanning line. The first scanning line is substantially parallel to the second scanning line.

The method of manufacturing the active device for controlling the liquid crystal display includes a step of depositing a conductive layer, a first transparent conductive layer and an insulating layer on a substrate. Afterward, the insulating layer, the first transparent conductive layer and the conductive layer are defined to form a first scanning line and a second scanning line, wherein the first scanning and the second scanning lines are separated with each other.

Next, a dielectric layer is deposited over the substrate and the insulating layer. Then, the dielectric layer is defined to have a first opening formed over the first scanning line to expose the insulating layer and a second opening formed over the second scanning line so as to expose the insulating layer.

Subsequently, a second transparent conductive layer is deposited over the substrate, the dielectric layer, and within the first and the second openings. Further, the next step is to define the second transparent conductive layer to form a first top layer within the first opening, and a second top layer within the second opening. The first top layer, the insulating layer and the first transparent conductive layer form the first thin film diode; the second top layer, the insulating layer and the first transparent conductive layer form the second thin film diode. The first thin film and the second thin film diode are electrically connected to a pixel electrode, respectively.

Next, please refer to FIGS. 3A to 5A, which illustrate a structure diagram of an embodiment of the metal-insulator-metal (MIM) thin film diode without slope structure according to the present invention.

Figure 3A:
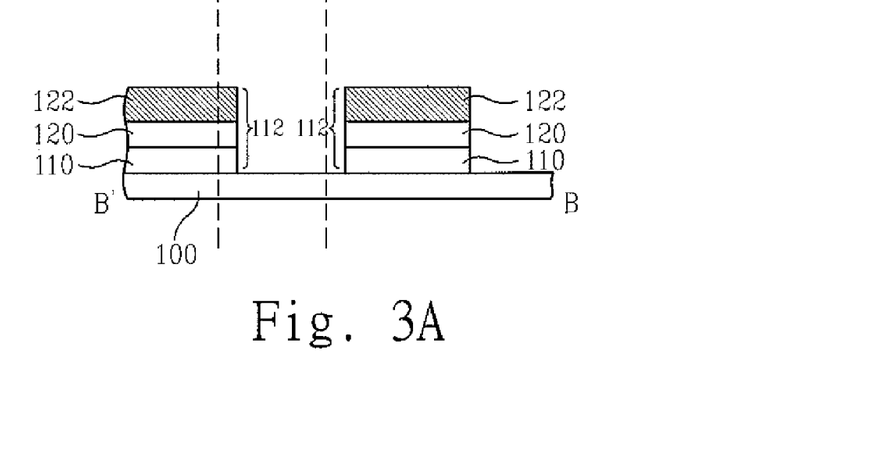
FIG. 3A and FIG. 3B illustrate a cross-sectional and a top views of the scanning line, the bottom electrode of the metal-insulator-metal (MIM) structure and the insulating layer according to the present invention.
Figure 3B:
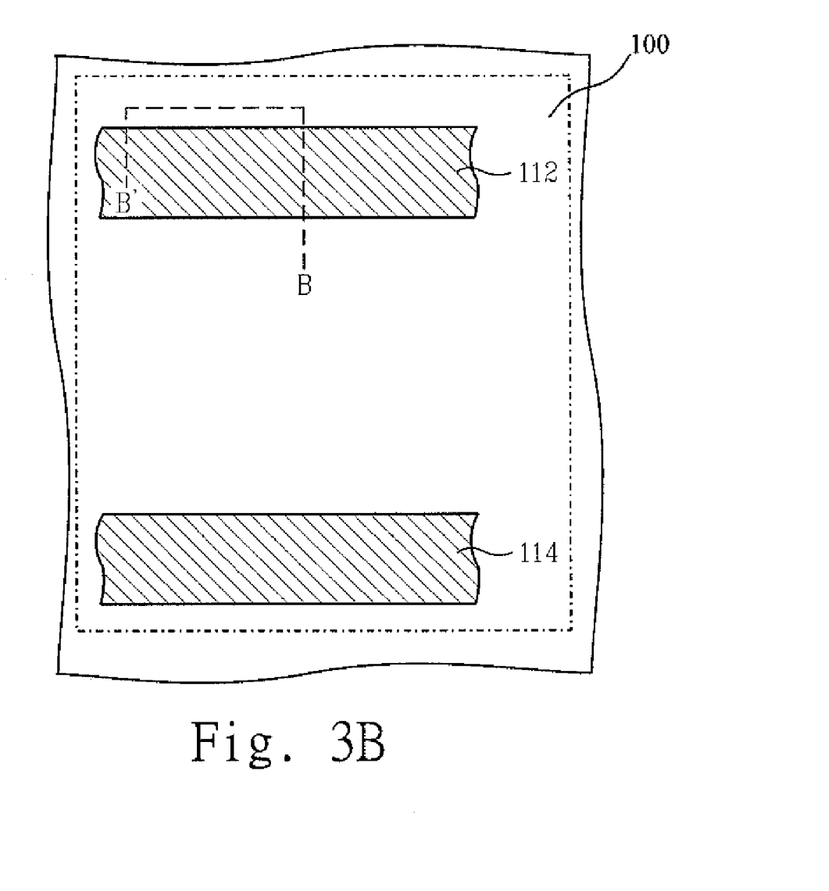

FIG. 3A and FIG. 3B illustrate a cross-sectional and a top views of the step of forming the scanning line 112. As shown in FIG. 3A, a metal layer 110, a first transparent conductive layer 120 and an insulating layer 122 are formed over a substrate 100 in sequence. Then, the insulating layer 122, the first transparent conductive layer 120 and the metal layer 110 are pattern by photolithography process to form the first scanning line 112 and the second scanning line 114 (shown as FIG. 3B). The metal layer 110 is primarily used to act as the first scanning line 112 and the second scanning line 114 for transmitting signals. The first transparent conductive layer 120 is primarily used to play the role of the bottom electrode of the MIM thin film diode. The insulating layer 122 is employed as the insulator layer of the MIM thin film diode.

The substrate 100 includes the transparent material, and the transparent material generally includes glass or transparent polymer. One of the characters of the metal layer 110 could be low resistance, thus the material for the metal layer 110 includes, for instance, aluminum (Al), chromium (Cr), molybdenum (Mo), Ti/Al/Ti, or the alloy of these metals. The metal layer 110 can be formed by sputtering, physical vapor deposition (PVD), electroplating or the vacuum evaporation. In one embodiment, the Ti/Al/Ti 110 is deposited on the substrate 100 by magnetron DC sputtering.

The first transparent conductive layer 120 can be made of indium-tin-oxide (ITO) or indium-zinc-oxide (IZO). In general, the first transparent conductive layer 120 is formed by physical vapor deposition (PVD), electroplating, the vacuum evaporation, or sputtering. Take the example of the sputtering of indium-tin-oxide, one method is to form the indium oxide and tin oxide respectively. Then, the target material of indium-tin-oxide is formed by sintering the powders of the indium-oxide and the tin-oxide. After the target material of the aerobic indium-tin-oxide is prepared, the target material is located in a process chamber, the glow discharge is then produced by discharging the Ar gases inside the process chamber, so that gases is ionized and impacts the indium-tin-oxide target material. Therefore, the ITO thin film is deposited on the glass substrates arranged at the anode by sputtering.

The material of the insulating layer 122, including silicon oxide, silicon oxynitride (SiON), tantalum oxide (TaO), or the alloy having carbon nitride ($C_3N_4$), is formed by chemical vapor deposition (CVD). Generally, silicon nitride ($SiN_x$) is used because the current-voltage character of the silicon nitride ($SiN_x$) is better. One type is Silicon-rich amorphous silicon nitride ($\alpha$-$SiN_x$:H) which is formed by plasma enhanced CVD (PECVD). The reaction gases include methane, ammonia and nitrogen.

The photolithography process includes photo-resist coating, baking, development and stripping the photo-resist after etching, wherein the photo-resist could be the positive photo-resist or negative photo-resist. The etching process can be wet etching or dry etching. It is because that the etching recipes of removal the insulating layer 122, the first transparent conductive layer 120 and the metal layer 110 are quite different. In generally, the dry etching will be introduced to the insulating layer 122 and the metal. In one embodiment, the etchant of the silicon nitride ($Si_3N_4$) includes hydrofluoric acid, the etchant of indium-tin-oxide is the mixture of hydrofluoric acid, nitric acid and hydrogen peroxide. The titanium/aluminum/titanium (Ti/Al/Ti) metal could be etched by the mixture of $Cl_2$ gas and Ar gas.

FIG. 3B is a top view according to the present invention, wherein the cross-section of the dotted line BB1 is showed as FIG. 3A. Two dotted lines are present in FIG. 3A in represent of the two transitions through along the dotted line BB' in FIG. 3B because the cross-section showed in FIG. 3A is not a straight line in FIG. 3B. In FIG. 3B, the pixel area is between the first scanning line 112 and the second scanning line 114. Due to the first scanning line 112 and the second scanning line 114 are covered by the insulating layer 122, therefore, the insulating layer 122 is represented by the shadow line in FIG. 3B. Because the manufacturing and the structure of the second scanning line 114 are similar with the first scanning line, the structure of the second scanning line 114 is not shown in FIG. 3A.

Figure 4A:
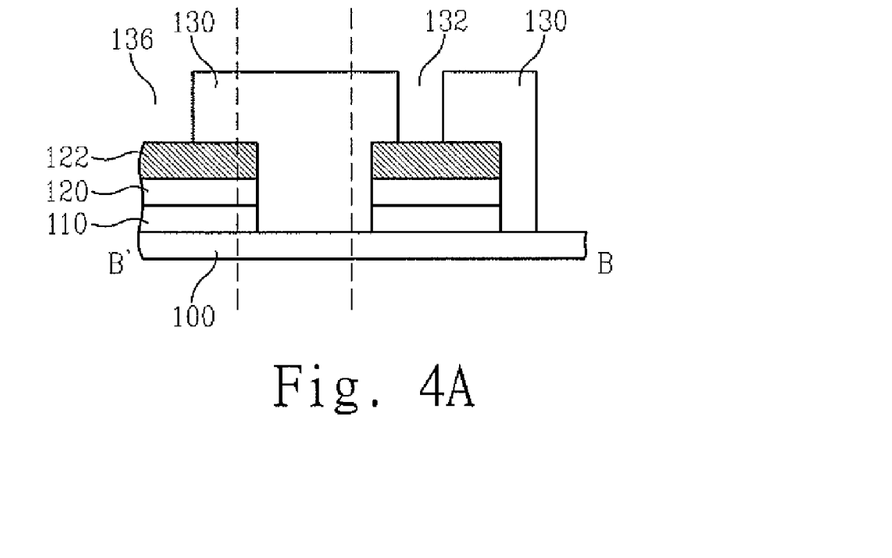
FIG. 4A and FIG. 4B illustrate a cross-sectional and a top views of the top electrode of the metal-insulator-metal structure and the terminal opening according to the present invention.

As shown in FIG. 4A, a dielectric layer 130 is formed over the substrate 100 and the insulating layer 122. Then, the first thin film diode opening 132 and the first terminal opening 136 are formed in the dielectric layer 130 by lithography process and etching process. The portion of the dielectric layer 130 over the pixel area is removed as well.

The material of the dielectric layer 130 is polymer insulator, such as polyimide or polyamide. It could be formed by coating, spin-on coating, or slit coating.

Figure 4B:
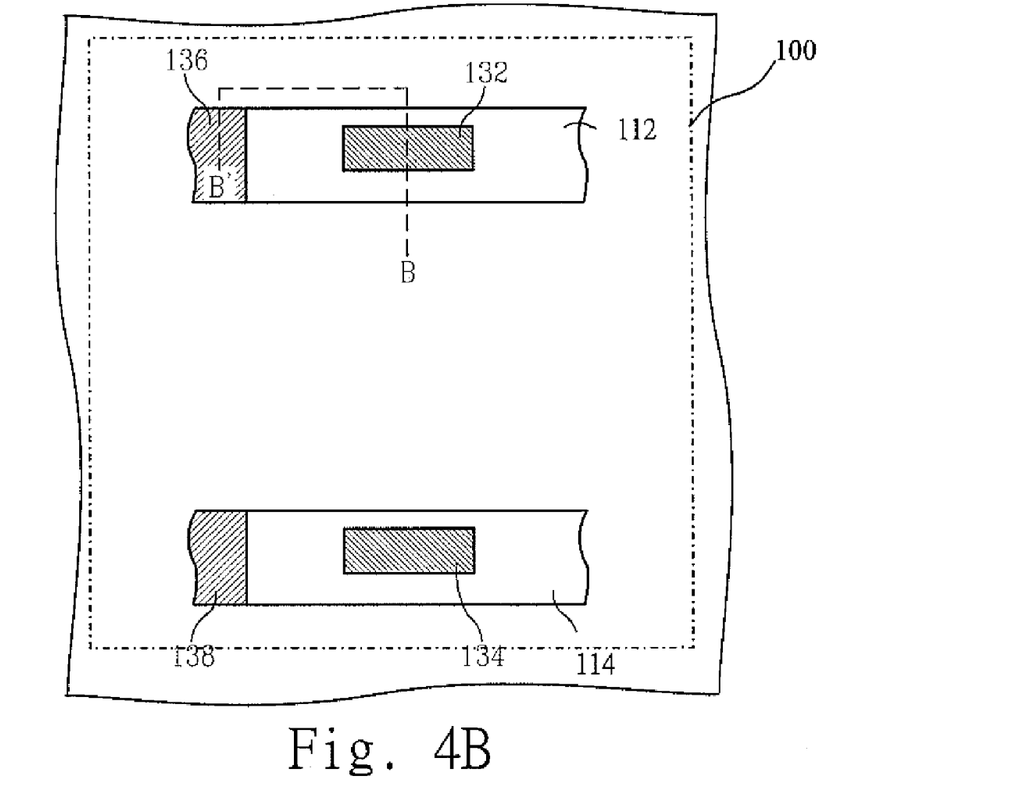

Please refer to FIG. 4B, the first thin film diode opening 132 and the first terminal opening 136 are formed over the first scanning line 112. The second thin film diode opening 134 and the second terminal opening 138 are also formed over the second scanning line 114.

Figure 5A:
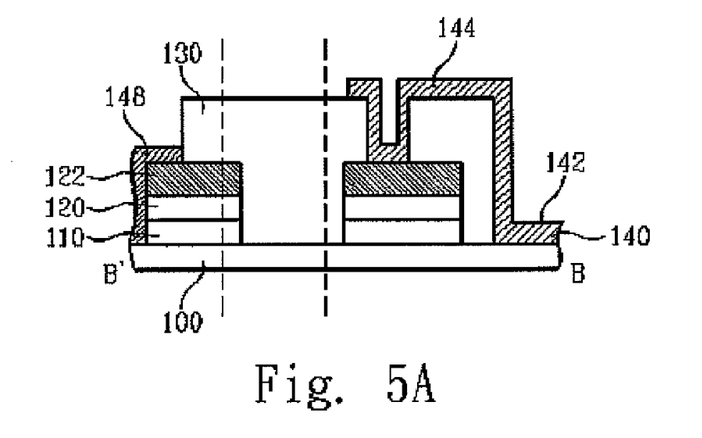
FIG. 5A and FIG. 5B illustrate a cross-sectional and a top views of the top electrode of the metal-insulator-metal structure, the terminal, and pixel electrode according to the present invention.

As showed in FIG. 5A, a second transparent conductive layer 140 is formed over the substrate 100, the dielectric layer 130, in the first thin film diode opening 132 and the first terminal opening 136. The pixel electrode 142 is formed at the pixel area by the second transparent conductive layer 140. The first top electrode 144 is formed inside the first thin film diode opening 132, and the first terminal 148 is formed within the first terminal opening 136. The material of the second transparent conductive layer 140 is similar with the material of the first transparent conductive layer 120.

Figure 5B:
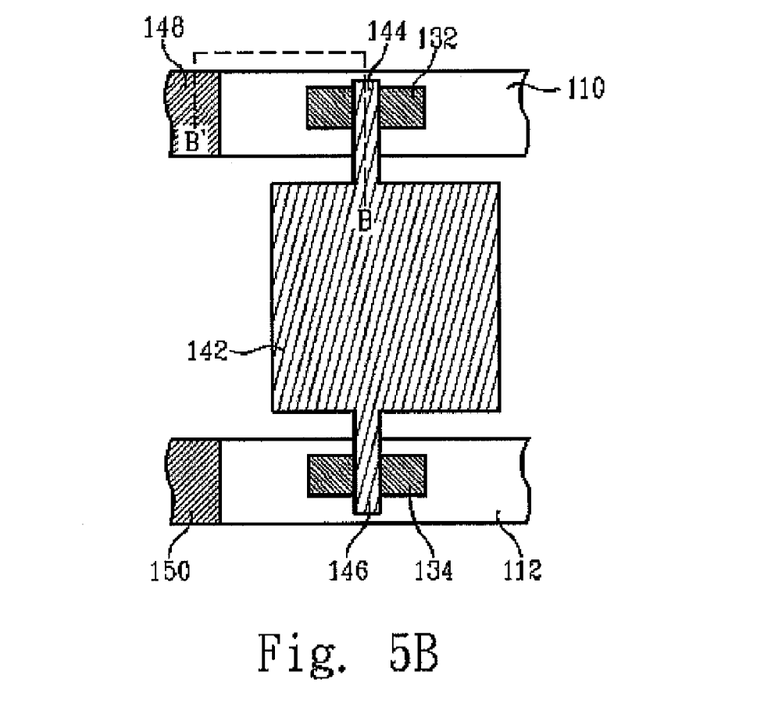

Turning to FIG. 5B, the first top electrode 144 is used to act as the top electrode of the first metal-insulator-metal thin film diode on the first scanning line 112, and the first thin film diode is constructed by the first top electrode 144, the insulating layer 122 and the first transparent conductive layer 120. The second top electrode 146 is used to be the top electrode of the second metal-insulator-metal thin film diode on the second scanning line 114, similarly, the second thin film diode is formed by the second top electrode 146 the insulating layer 122 and the first transparent conductive layer 120. The first terminal 148 is configured on the first scanning line 112, and the second terminal 150 is configured on the second scanning line 114. The signal of IC is transmitted to scanning line by side contact of ITO and metal.

In FIG. 5B, the overlapping area between the top electrode 144 and the top opening 132 is the area of the first metal-insulator-metal thin film diode. If the alignment during the photolithography process is shift, the area of the first metal-insulator-metal thin film diode will not be change. It indicates that the present invention allows higher tolerance.

Because the top electrode of the metal-insulator-metal thin film diode is formed within the opening, the slope structure of the metal-insulator-metal thin film diode will not be formed. Therefore, the breakdown voltage and bad point will not occur on the thin film diode structure. Besides, the transparent conductive layers are adopted to the top and bottom electrode of the metal-insulator-metal thin film diode, so that the single metal-insulator-metal thin film diode has the symmetric current-voltage curve. Accordingly, the present invention needs not to use the complex back-to-back thin film diode as the active device of the liquid crystal display. On the other hand, the structure of the present invention is uncomplicated and the photo mask number will not be increase, both indicate that the yield and product reliability can be improved. Moreover, the still another object of the present invention is that the area of the metal-insulator-metal thin film diode will not be affected by the alignment and the exposure precision, and the areas of the metal-insulator-metal thin film diode are almost the same.

Figure 6:
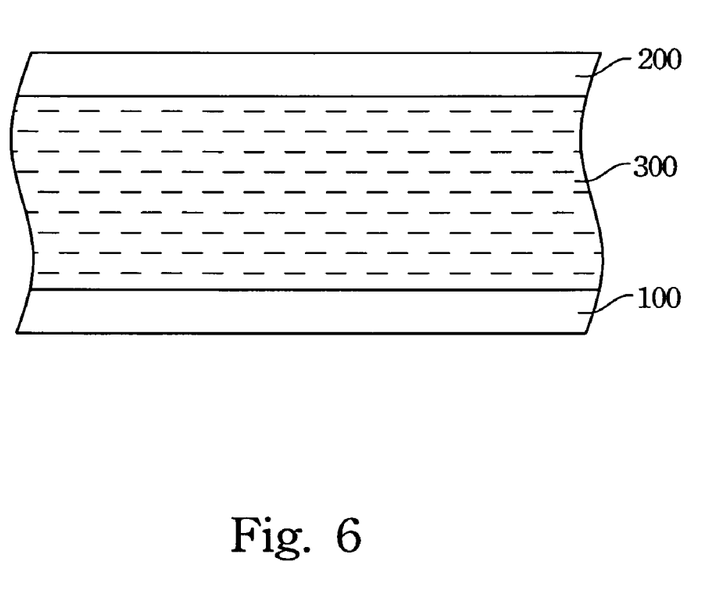
FIG. 6 is a cross-sectional diagram showing a general liquid crystal display.

FIG. 6 is a cross-sectional diagram showing a general liquid crystal display. In FIG. 6, a liquid crystal display can be formed by the following steps. First, a second substrate 200 is assembled to the first substrate 100 having the structure disclosed above. Next, liquid crystal molecules 300 are disposed between the first substrate 100 and the second substrate 200 to obtain the liquid crystal display.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and same arrangements included within the spirit and scope of the appended claims, the scope of which should be accorded the broadest interpretation so as to encompass all such modifications and same structures While the preferred embodiment of the invention has been illustrated and described, it will be appreciated that various changes can be made therein without departing from the spirit and scope of the invention.

The invention claimed is:

1. A thin film diode liquid crystal display panel, comprising:
   a first substrate, including:
      a first scanning line and a second scanning line formed on said first substrate and separated with each other, wherein said first scanning line and said second scanning line are formed of a conductive layer;
      a first transparent conductive layer formed on said first scanning line and said second scanning line;
      an insulating layer formed on said first transparent conductive layer;
      a dielectric layer formed over said first substrate and said insulating layer, wherein said dielectric layer has a first opening over said first scanning line to expose said insulating layer, a second opening over said second scanning line to expose said insulating layer, and a third opening at a pixel area; and
      a second transparent conductive layer formed within said first opening, said second opening and said third opening, wherein said second transparent conductive layer formed in said first opening, said insulating layer and said first transparent conductive layer form a first thin film diode, said second transparent conductive layer in said second opening, said insulating layer and said first transparent conductive layer form a second thin film diode, said second transparent conductive layer forms a first pixel electrode at said pixel area, and said first pixel electrode is electrically connected to said first thin film diode and said second thin film diode through said second transparent conductive layer;
   a second substrate assembled to said first substrate; and
   liquid crystal molecules disposed between said first substrate and said second substrate.

2. The panel of claim 1, wherein said dielectric layer further includes a first contact window and a second contact window, said first contact window being formed on said first scanning line, and said second contact window being formed on said second scanning line.

3. The panel of claim 2, wherein said second transparent conductive layer is formed over said first contact window to act as a first terminal of said first scanning line, and over said second contact window act as a second terminal of said second scanning line.

4. The panel of claim 1, wherein the materials of said first transparent conductive layer and said second transparent conductive layer are selected from indium-tin-oxide (ITO) or indium-zinc-oxide (IZO).

5. The panel of claim 1, wherein the material of said insulating layer is selected from silicon oxide, silicon oxynitride (SiON), tantalum oxide (TaO) or the alloy having carbon nitride ($C_3N_4$).

6. The panel of claim 1, wherein the material of said conductive layer is selected from aluminum (Al), chromium (Cr), molybdenum (Mo) or titanium/aluminum/titanium tri-layer.

7. The panel of claim 1, wherein said first pixel electrode is formed between said first scanning line and said second scanning line.

8. The panel of claim 1, wherein said first scanning line and said second scanning line are substantially parallel with each other.

9. An active device for controlling the liquid crystal display, comprising:
  a first scanning line and a second scanning line separated with each other, wherein said first scanning line and said second scanning line are formed of a conductive layer;
  a first transparent conductive layer and an insulating layer formed in sequence over said first scanning line and said second scanning line;
  a dielectric layer formed over said insulating layer, wherein said dielectric layer has a first opening over said first scanning line to expose said insulating layer, a second opening over said second scanning line to expose said insulating layer; and
  a second transparent conductive layer formed within said first opening and said second opening, wherein said second transparent conductive layer formed in said first opening, said insulating layer and said first transparent conductive layer form a first thin film diode, and said second transparent conductive layer inside said second opening, said insulating layer and said first transparent conductive layer form a second thin film diode, thereby a pixel electrode being electrically connected to said first thin film diode and said second thin film diode.

10. The active device of claim 9, wherein the materials of said first transparent conductive layer and said second transparent conductive layer are selected from indium-tin-oxide (ITO) or indium-zinc-oxide (IZO).

11. The active device of claim 9, wherein the material of said insulating layer is selected from silicon oxide, silicon oxynitride (SiON), tantalum oxide (TaO) or the alloy having carbon nitride ($C_3N_4$).

12. The active device of claim 9, wherein the material of said conductive layer is selected from aluminum (Al), chromium (Cr), molybdenum (Mo) or titanium/aluminum/titanium tri-layer.

13. The active device of claim 9, wherein said pixel electrode is formed between said first scanning line and said second scanning line.

14. The active device of claim 9, wherein said first scanning line and said second scanning line are substantially parallel with each other.

* * * * *